United States Patent [19]

Comfort et al.

[11] Patent Number: 5,495,590
[45] Date of Patent: Feb. 27, 1996

[54] CHECKPOINT SYNCHRONIZATION WITH INSTRUCTION OVERLAP ENABLED

[75] Inventors: Steven T. Comfort, Poughkeepsie, N.Y.; Clifford O. Hayden, Jamaica Plain, Mass.; John S. Liptay, Rhinebeck, N.Y.; Susan B. Stillman; Charles F. Webb, both of Poughkeepsie, N.Y.

[73] Assignee: International Business Machines Corporation, Armonk, N.Y.

[21] Appl. No.: 480,107

[22] Filed: Jun. 7, 1995

Related U.S. Application Data

[62] Division of Ser. No. 263,497, Jun. 21, 1994, which is a continuation of Ser. No. 752,151, Aug. 29, 1991, abandoned.

[51] Int. Cl.$^6$ .................................................. G06F 9/38
[52] U.S. Cl. .................... 395/375; 395/800; 364/231.8; 364/263; 364/DIG. 1
[58] Field of Search .................... 395/800, 775, 395/650, 575, 550, 425, 375; 371/12, 13, 16.1, 16.5, 40.2, 49.1, 68.3; 364/131–134

[56] References Cited

U.S. PATENT DOCUMENTS

| | | | |
|---|---|---|---|
| 3,736,566 | 5/1973 | Anderson et al. | 395/575 |
| 4,044,337 | 8/1977 | Hicks et al. | 395/250 |
| 4,387,427 | 6/1983 | Cox et al. | 395/650 |
| 4,445,174 | 4/1984 | Fletcher | 395/425 |
| 4,513,367 | 4/1985 | Chan et al. | 395/575 |
| 4,740,969 | 4/1988 | Fremont | 371/13 |
| 4,852,092 | 7/1989 | Makita | 371/12 |
| 4,901,233 | 2/1990 | Liptay | 395/375 |
| 4,912,707 | 3/1990 | Kogge et al. | 371/12 |
| 4,987,532 | 1/1991 | Noguchi | 395/375 |
| 5,003,458 | 3/1991 | Yamaguchi et al. | 395/375 |
| 5,043,871 | 8/1991 | Nishigaki et al. | 395/600 |
| 5,127,006 | 6/1992 | Subramanian et al. | 371/16.1 |
| 5,235,700 | 8/1993 | Alaiwan et al. | 395/575 |
| 5,301,309 | 4/1994 | Sugano | 395/575 |
| 5,355,457 | 10/1994 | Shebanow et al. | 395/375 |
| 5,418,916 | 5/1995 | Hall et al. | 395/375 |

FOREIGN PATENT DOCUMENTS

| | | |
|---|---|---|
| 0398639 | 11/1990 | European Pat. Off. . |
| 0495165 | 7/1992 | European Pat. Off. . |

OTHER PUBLICATIONS

Enterprise Systems Architecture/390 Principles of Operation, Index and pp. 5–12–5–14 and 11–11 through 11–26, Oct. 1990.

"Opcode Compare Facility", Research Disclosure, No. 315, Emsworth, GB, p. 577, Jul. 1990.

*Primary Examiner*—Alyssa H. Bowler
*Assistant Examiner*—Alpesh M. Shah
*Attorney, Agent, or Firm*—Whitham, Curtis, Whitham & McGinn; Lynn L. Augspurger

[57] ABSTRACT

An instruction processing system and method which utilizes instruction completion to isolate errors, including those in the post-completion processing of operand stores, to an interval between checkpoints, while allowing the processing of checkpointing instructions to be overlapped with that of other instructions. Checkpoints are established before and after such instructions, and all processing (including that of operand stores) from before a checkpoint must be done prior to allowing instruction completion to move beyond the checkpoint. Nevertheless, instructions from beyond a checkpoint are allowed to be processed up to the point of completion while waiting for the checkpoint to be cleared. The point at which instructions must wait on a prior checkpoint is thus moved to the final phase of instruction processing (instruction completion), at significant performance advantage over a conventional implementation in which this waiting is done at instruction fetch, decode, or execution time.

6 Claims, 4 Drawing Sheets

CHECKPOINT SYNCHRONIZATION WITH INSTRUCTION OVERLAP ENABLED

CROSS REFERENCE TO RELATED APPLICATION

This application is a division of application Ser. No. 08/263,497 filed Jun. 21, 1994, which is a continuation of application Ser. No. 07/752,151 filed Aug.29, 1991, now abandoned.

I. BACKGROUND OF THE INVENTION a. Field of The Invention

This invention relates to data processing systems having provision for executing instructions in an overlapped or pipelined fashion, and for detecting errors associated with that execution. More particularly, this invention relates to data processing systems which must isolate the effects of errors to a specific portion of the instruction stream being executed.

b. Related Art

As data processing systems have increased in speed and complexity, the extent to which the execution of multiple instructions is overlapped has increased. One consequence of this is that a random error occurring in such a system may not be easily isolated to one instruction, and may in fact affect the execution of several instructions. It is known in the art to provide a computer system with a mechanism which will discard and retry all instructions which may have been affected by a given error, and thus to insure that error is not reflected in the results of program execution. Such mechanisms are described, for example, in U.S. Pat. No. 4,912,707 to Kogge et al. and U.S. Pat. No. 4,044,337 to Hicks et al. (both assigned to International Business Machines Corporation).

Such retry mechanisms can not hide the effects of every error, however. For example, a particular problem is posed by errors which have occurred after an instruction has passed the point at which it can be retried. For this and other cases where retry is not successful in completely hiding the effects of the error from the program, the system will conventionally alert the program about the error via a "machine check" interruption.

When a machine check is presented to it, the program must determine what corrective action to take. Vital to this effort is information provided by the data processing system as to the extent of the damage which may have occurred, with respect to architected facilities and with respect to the instruction stream. In IBM's Enterprise Systems Architecture/390 (ESA/390) this information is communicated via the Machine Check Interruption Code (MCIC) in storage. The ESA/390 Architecture is described in more detail in the document *Enterprise Systems Architecture/390—Principles of Operation* (document SA22-7201-0, Available from International Business Machines Corporation, Armonk N.Y.) which is incorporated by reference herein in its entirety.

Various MCIC bits reflect the validity of different architected registers and facilities, while other bits indicate the severity of the error. Of particular interest to this invention is the distinction between the two most severe types of machine check interrupt:

Instruction-Processing Damage (IPD)

System Damage (SD).

Both the IPD and SD machine check types indicate that the error may have affected the results of instructions which have been completed, as indicated by the instruction address reported with the machine check. In other words, both IPD and SD machine checks indicate that the machine state (storage, registers, other architected facilities) may have been corrupted and thus could be inconsistent with the instructions which have been executed. In certain situations it is impossible or undesirable to continue operation when a machine error occurs. In these cases, the processor is placed in a check-stop state and no machine check interrupt is presented.

The primary difference between the IPD and SD machine check types is in the scope of the failure with respect to the instruction stream. An IPD machine check indicates that the effects of the failure are confined to instructions executed? a particular point in the instruction stream, whereas the effects of an error causing an SD machine check are not confined to any particular instruction stream interval. Thus the program, upon receiving an IPD machine check interruption, can be sure that only the currently executing segment of the instruction stream is effected, and specific corrective action can be taken. On the other hand, when the program sees an SD machine check interruption, it cannot depend upon any of the instruction stream or architected state being correct, and more drastic action will be required, often resulting in the termination of the entire program (i.e. the system "crashes"). It is thus advantageous to isolate the effects of errors in as many cases as possible, to maximize the overall availability of the system (both hardware and software) to its users.

The ESA/390 architecture establishes the degree of isolation required for IPD machine checks by requiring that a checkpoint synchronization operation take place at certain points in the instruction stream. A checkpoint synchronization operation essentially consists of insuring that all operations associated with instructions from before that point in the instruction stream (hereafter referred to simply as the "checkpoint") are complete prior to proceeding with instructions from beyond the checkpoint. In this context, "complete" means that these operations are no longer capable of causing an IPD machine check. Once the processor has proceeded past the checkpoint, any error associated with an operation from before the checkpoint must be reported as an SD machine check or must cause the processor to checkstop.

These checkpoints are generally defined to occur immediately before and immediately after certain instructions and all interruptions. In some cases the ESA/390 architecture requires checkpoint synchronization only before or after (not both) a particular instruction, but in the preferred embodiment of this invention it is done both before and after the instruction in all cases, and that implementation will be assumed throughout.

Another characteristic of these checkpoints is they are all also defined in the ESA/390 architecture as Serialization points. The serialization architecture relates to interactions between processors with respect to resources shared by those processors, and thus is distinct in purpose from the checkpoint synchronization architecture. However, the commonality of points requiring these operations leads naturally to commonality in an implementation of the architecture. In a conventional implementation of the ESA/390 architecture (and its ESA/370 predecessors), serialization required a complete cessation of overlapped instruction processing, so that no processing for instructions beyond the serialization point was allowed until all processing from before the serialization point had been completed, including all operand stores. Since checkpoints are a subset of serialization points, the same was true for all checkpoints, and the isolation of instruction processing errors to an interval between two checkpoints was generally straightforward. However, in copending U.S. patent application Ser. No. 07/641,987,now U.S. Pat. No. 5,251,354, entitled "Overlapped Serialization" (to Comfort et al.; filed Jan. 16, 1991; assigned to International Business Machines Corporation), a mechanism is described whereby overlapped instruction processing is made possible even around serialization points consistently with the architectural definition. Given such an implementation of serialization, the fact that all checkpoints are serialization points no longer insures that there is no instruction processing overlap around checkpoints, and a different mechanism is called for to provide error isolation for checkpoint synchronization.

In many systems conforming to ESA/390 Architecture, the processor implementation is such that the detection and isolation of errors is possible, in most cases, on an instruction basis. That is, most instruction processing errors are detected such that no instructions which may have been affected by a given error are allowed to be completed, and changes to architected facilities are managed such that these may be undone if the instruction making a given change is not completed. Thus, when an error is detected all instructions which have not yet been completed are blocked from being completed, all changes to architected facilities which were to have been made by those instructions are discarded, and those instructions can be refetched and reprocessed with no effect from the initial error. In this way, with respect to errors which occur prior to completion, every instruction (not just those required by the architecture) establishes a checkpoint.

Even with such an implementation, however, there are some errors associated with the processing of a particular instruction which cannot block the completion of that instruction. Specifically, errors occurring during the act of completion itself and during the processing of operand stores done by that instruction fall into this category. Errors during the act of completion itself are generally unrecoverable (i.e. a machine check interrupt will be required), but so long as no instructions are completed beyond a checkpoint which is beyond the point of error, that error will be isolated to the current checkpoint interval as required by the architecture and an IPD machine check is allowed. This may be accomplished by blocking subsequent instruction completion when such an error is detected.

Errors during the processing of operand stores, however, pose a more difficult problem with respect to checkpoint synchronization. This is due to the fact that operand stores are held in a buffer until the storing instruction is completed (to allow the store to be discarded if the instruction is never completed), and only after instruction completion are the stores for an instruction written into the storage arrays, including any storage caches. Thus there may be a considerable delay between completion of an instruction and the processing of its operand stores. During that time, it is desirable to be able to complete subsequent instructions in order to maintain the high degree of overlapped instruction processing needed for a high performance processor. At the same time, it is desirable that the processor not proceed past a subsequent checkpoint while stores from before the checkpoint are still being processed, since that would imply that errors during the processing of stores would not be reliably isolated to a checkpoint interval, and thus that such errors would require an SD machine check or processor checkstop. This invention describes a mechanism for providing the required isolation of errors on operand stores while maintaining a high degree of instruction overlap in such a processor.

With any mechanism for checkpoint synchronization, there is a trade-off to be made between system performance and system reliability and availability. Specifically, the point at which the processing of operand stores is deemed "complete" is variable. If this point is chosen earlier in the processing of stores, checkpoints may be deemed "cleared" earlier in time, usually resulting in an improvement in processor performance, but with a concomitant increase in the probability of an error which will require an SD machine check. Conversely, if a point later in the processing of stores is chosen, there will be a longer delay in clearing the checkpoint, with an associated performance penalty, but with a reduced risk of an error which would affect system reliability and availability. This trade-off is independent of the present invention, except insofar as it reduces the overall performance cost of checkpoint synchronization.

II. SUMMARY OF THE INVENTION

This invention utilizes instruction completion to isolate errors, including those in the post-completion processing of operand stores, to an interval between checkpoints, while allowing the processing of checkpointing instructions to be overlapped with that of other instructions. Checkpoints are established before and after such instructions, and all processing (including that of operand stores) from before a checkpoint must be done prior to allowing instruction completion to move beyond the checkpoint. Nevertheless, instructions from beyond a checkpoint are allowed to be processed up to the point of completion while waiting for the checkpoint to be cleared. The point at which instructions must wait on a prior checkpoint is thus moved to the final phase of instruction processing (instruction completion), at significant performance advantage over a conventional implementation in which this waiting is done at instruction fetch, decode, or execution time.

III. BRIEF DESCRIPTION OF THE DRAWINGS

The present invention will be described with reference to the accompanying drawings, in which.

IV. DETAILED DESCRIPTION OF PREFERRED EMBODIMENT

Figure 1:
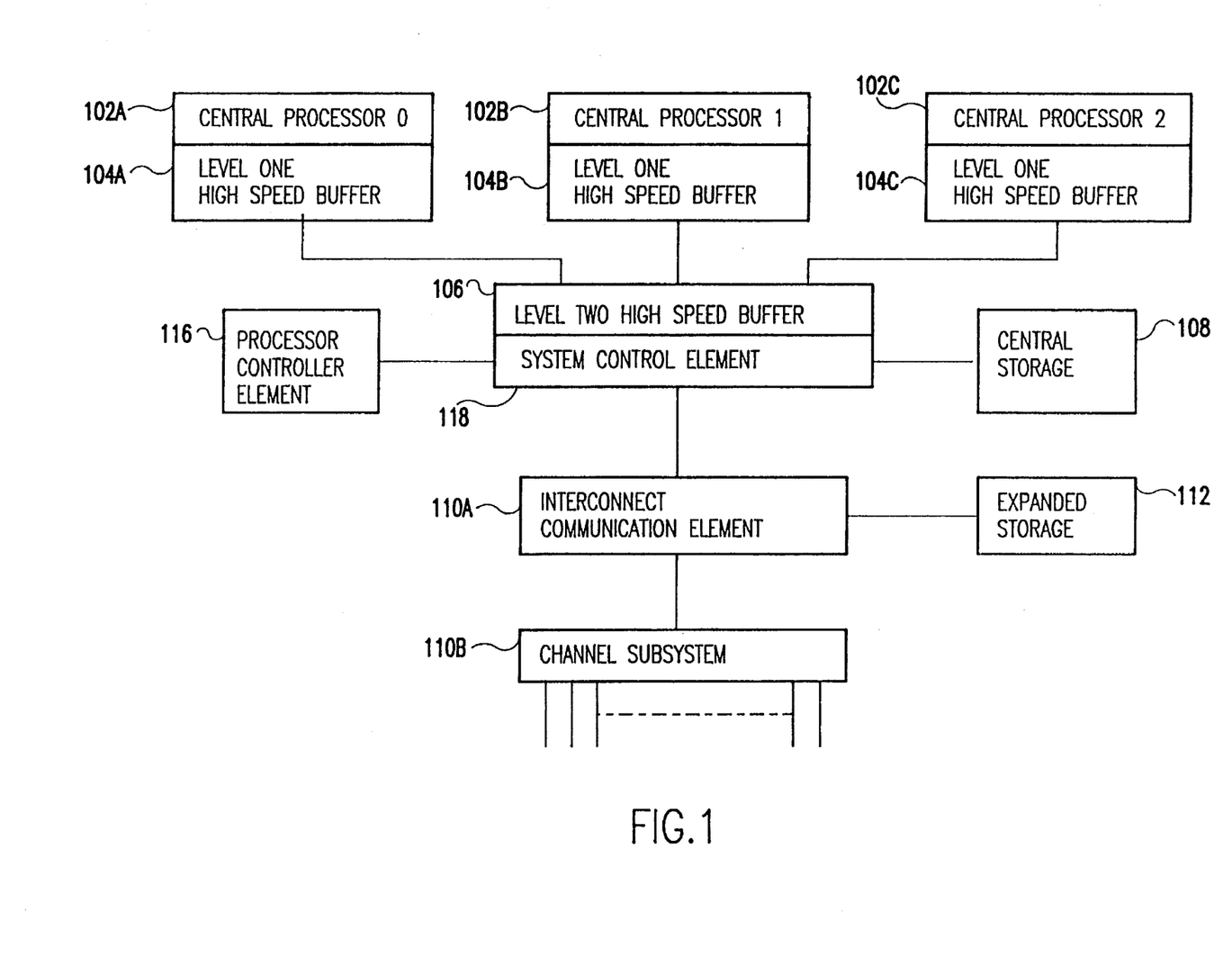
FIG. 1 is a block diagram of a Central Electronic Complex (CEC)

The invention will now be described with reference to FIGS. 1 though 4. FIG. 1 is a block diagram of a Central Electronic Complex (CEC) including three Central Processors 102a–c. Each Central Processor (CP) has its own conventional first level high speed buffer (L1) 104a–c. The L1s are connected in turn to a second level high speed buffer (L2) 106 which is shared by all the CPs. The L2 106 is connected to Central Storage 108, also known as main storage, through a System Control Element (SCE) 118. The general term 'storage' is used to refer to data existing in either level high speed buffer (104a–c or 106) or the Central Storage 108 itself.

The CEC of FIG. 1 also includes an Interconnect Communication Element (ICE) 110a which controls data transfer and communication between the SCE 118, an Expanded Storage (ES) 112 and a Channel Subsystem 110b. The ICE 110a and Channel Subsystem 110b are also collectively referred to as the I/O Subsystem. System operations and support functions such as powering on and off and configuring the system are controlled by a support processor called the Processor Controller Element (PCE) 116. The PCE is also used to assist system elements in recovering from errors. Machine-Check error handling, checkpoint synchronization and the general operation of systems conforming to ESA/390 architecture are further described the Enterprise Systems Architecture/390 Principles of Operation.

Figure 2:
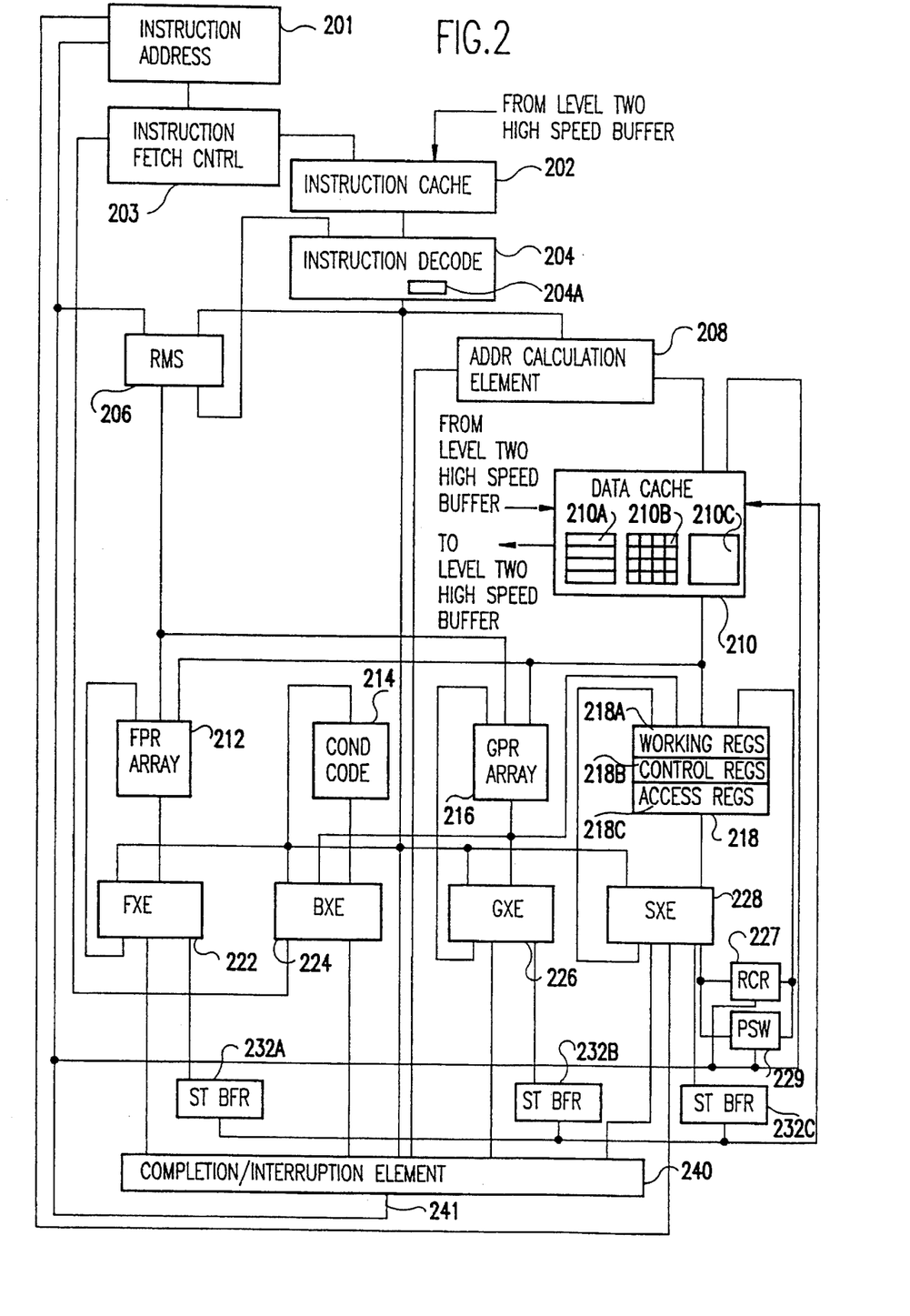
FIG. 2 is a functional diagram of an exemplary Central Processor (CP) according to the preferred embodiment of the present invention, within the CEC of FIG. 1.

FIG. 2 is a functional diagram of an exemplary Central Processor 102 according to the preferred embodiment of the present invention, within the CEC of FIG. 1. The processor of FIG. 2 is of a type which operates according to the IBM ESA/390 Architecture. As is conventional, each CP's first level high speed buffer (L1) is of the split-cache type including an instruction cache 202 and a data cache 210. Instructions from the instruction cache 202 are fetched by the Instruction Fetch Control Logic 203 and fed to the Instruction Decode Logic 204.

The Instruction Decode Logic 204 determines what type of instruction is to be executed and what type of data is required for its execution (General Purpose Registers, Floating Point Registers, Data from Storage, other) and forwards the instruction to the appropriate execution element (Floating Point Execution Element 222, Branch Execution Element 224, General Execution Element 226, or System Execution Element 228) and support logic (Register Management System 206, Address Calculation Element 208 and Completion/Interruption Element 240). The instruction Decode Logic 204 also includes controls 204A which enable the CP to block or suspend (and unblock/recommence) decoding of all or specified types of instructions.

The Register Management System 206 controls the assignment of physical registers (Floating Point Register Array 212 and General Purpose Register Array 216) to corresponding logical registers referenced by instructions. The structure and operation of the Register Management System is described in more detail in U.S. Pat. No. 4,901,233.

The CP of FIG. 2 includes a number of specialized execution elements which receive instructions and data from the Instruction Decode Logic 204 and Data Cache 210, respectively. As in prior art systems, a conventional branch history table (BHT) associated with the I-FETCH logic 203 predicts which direction a branch will take. Responsive to such a branch prediction, subsequent instructions are fetched in the predicted direction and conditionally executed. The Branch Execution Element (BXE) 224 is dedicated to determining the way a branch will actually resolve and whether the prediction was correct. The Floating Point Execution Element (FXE) 222 is connected to the physical Floating Point Register Array 212 and is dedicated to processing floating point instructions. The General Execution Element (GXE) 226 is connected to the physical General Purpose Register Array 216. The GXE executes simple instructions which change or use general purpose registers (GPRs) and some of the simple store instructions such as MOVE IMMEDIATE.

The System Execution Element (SXE) 228 is a microcode driven execution element. The SXE microcode implements all checkpointing instructions (described in more detail later) and includes the CP recovery microcode. The System Execution Element is connected to a set of registers 218; the working registers 218A, the Control Registers 218B, and the Access Registers 218C. The SXE's Working Registers are temporary storage positions for intermediate results, data from storage, and system data that needs to be kept easily accessible. The SXE 228 is also connected to bits 0 to 31 of the Program Status Word (PSW) 229. Bits 32 through 63 are handled differently and are referred to as the Instruction Address 201. The SXE 228 executes Storage to Storage type logical and decimal instructions and system control functions such as LOAD PSW and START INTERPRETIVE EXECUTION.

The Recovery Control Register 227 is also controlled by the SXE 228. The Recovery Control Register (RCR) 227 provides a mechanism for maintaining recovery footprints which are assembled during execution and used when recovering from a system error. The CP recovery microcode loads, sets and reads the Recovery Control Register 227 and performs the CP error recovery procedures.

Each execution element except for the Branch Execution Element 224 has an associated set of store buffers 232a–c. These buffers hold execution results destined for storage until the instruction which executed the store is completed and the data can be moved into the high speed buffers 210 and 106 in FIG. 1. Each of the ACE 208, the FXE 222, the BXE 224, the GXE 226 and the SXE 228 also have associated input instruction queues (not shown).

The Data Cache (D-Cache) 210 includes a store queue 210A, a D-Cache memory array 210B and checkpoint controls 210C. The store queue 210A contains the address and control information for the operand stores buffered in the store buffers 232A–C. The data cache memory array 210B is a conventional set associative cache memory. The data cache checkpoint controls 210C determine when checkpoint synchronization has completed. The Data Cache 210 is connected to the Level Two High Speed Buffer 106 of the CEC of FIG. 1.

The Completion/Interruption Element 240 controls instruction completion and interrupt handling by completing instructions in logical order when their executions have finished and recognizing any program exceptions which may have been encountered during execution or asynchronous interrupts which may be pending. As a result of an instruction completing, the Condition Code 214 may be updated. This in turn is used by the Branch Execution Element 224 to resolve guessed branches.

The Instruction Address 201 is the address of the next instruction to complete which is equivalent to the instruction address as a result of the last instruction to complete. It is updated by the SXE 228, the Completion Reports 241 generated by the Completion/Interrupt Logic 240, and branch target addresses.

The Address Calculation Element (ACE) 208 calculates operand addresses, generates operand fetch and store requests and sends these to the D-cache 210, which processes them in the order specified by the instruction stream. When an operand store request is made, an entry is placed in the store queue 210A which contains various address and control information about that operand store. When an instruction which includes an operand store is processed, an execution unit (FXE 222, GXE 226, or SXE 228) generates the store result and places the result in the corresponding store buffer 232(A–C).

The Central Processor of FIG. 2 is of a type that allows concurrent, out-of-order execution of instructions by several different processing elements. While instructions can be executed out-of-sequence, the results of most instructions are not made visible to other system elements beyond the CP until the instruction is "architecturally completed" by the Completion/Interruption Element 240. Completion of the instruction occurs when the execution of the instruction is finished, all exceptions associated with the instruction have been tested for and the instruction is the next one to logically complete (i.e. instructions complete in their logical program sequence even though they may have been executed out-of-sequence).

As the result of the "Completion Report" 241 which is generated by the Completion/Interruption Element 240 to signal the completion of an instruction, the D-cache 210 marks all entries in the store queue 210A for that instruction as having been completed. Subsequently the D-cache 210 takes the store results from the store buffers 232(A–C) and writes these into the D-cache array 210B. The store results are also forwarded at this time to the Level Two High Speed Buffer (L2) 106 to be stored there. The L2 106 provides an indication to the D-cache 210 of when the stores sent to it have been "done". For the purposes of the present invention, stores are considered "done" when they have reached a point in the L2 106 beyond which errors are extremely unlikely or can no longer be associated with a specific operand store. Any errors in the processing of an operand store before the point at which the store is considered "done" will be isolated to the current checkpoint interval. Any errors beyond that point in the processing of a store will not be so isolated.

Also, upon receipt of the completion report from the completion/interruption element 240 the Register Management System 206 updates its pointers to show that the GPR and FPR values changed by this instruction are now the architected values, the Condition Code 214 is updated and the Instruction Address 201 is incremented or changed.

The store buffers 232A–C and the Register Management System 206 enable the processor to not only fetch, but execute past a number of unresolved branches. This is described in detail in U.S. Pat. No. 4,901,233. If a branch is guessed incorrectly, all instructions logically after the branch, even though they may have finished, can be nullified, since their results are buffered and not yet visible to the rest of the system. Program exceptions act in the same manner; when an instruction with a program exception completes, all instructions logically after it are made to disappear. Asynchronous interrupts for which the processor is enabled are handled when an instruction completes. Here again, instructions logically after that point are nullified and processing is diverted to another instruction stream.

The ESA/390 architecture defines certain instructions as checkpointing instructions, and requires that checkpoint synchronization operations be performed before and after processing those instructions. (In some cases, the architecture requires the instruction synchronization operation only before or after the instruction, rather than both before and after. In the preferred embodiment of the present invention, the checkpoint synchronization operation is performed both before and after the instruction in every case.) The fact that a given instruction checkpoints is determined by I-decode 202. All checkpointing instructions are executed in the SXE 228.

The Execution of each instruction within the ESA/390 Architecture consists of one or more operations. Each of these is referred to as a "unit of operation". As an instruction executes, the unit or units of operation will be completed by the CP. The ESA/390 Architecture permits interrupts to be taken at the points between units of operation (after completion of each unit of operation). An instruction is considered "complete" when its last unit of operation is "complete". For most instructions in the ESA/390 Architecture, the entire execution of the instruction is considered one unit of operation. Some instructions, however, comprise more than one unit of operation. These instructions (e.g. MOVE LONG, COMPARE LOGICAL LONG, TEST BLOCK) are interruptible in that the instruction can be interrupted during execution, after completion of any internal unit of operation. Completion, interruptible instruction, units of operation and program execution are discussed in more detail in the ESA/390 Principles of Operation.

In addition to those instructions specified by the architecture as having multiple units of operation, the processor can divide other instructions into units of operation as needed. In these cases, interrupts are not allowed between the units of operation, but only between instructions. In any case, when unit of operation is completed its results are committed to architected facilities such that prior values of those facilities cannot, in general, be restored. This includes loading new values into registers and writing operand store results into storage.

According to an embodiment of the present invention, each checkpointing instruction which includes operand stores comprises at least two units of operation, the last of which generates no new results. This enables the results from the checkpointing instruction to be committed to architected registers and to storage prior to completing the instruction. By this means, errors associated with actions that normally take place after instruction completion are, for such an instruction, detected prior to completion and thus isolated to have occurred before the checkpoint which is required after that instruction. In addition, the first unit of operation for a checkpointing instruction cannot be finished and completed until all processing for prior instructions, including the writing of operand stores into storage, is done. This isolates any errors associated with instructions before the checkpointing instruction to have occurred before the checkpoint required before that instruction. For those checkpointing instructions which do not include operand stores, there are no errors which can occur after completion, thus multiple units of operation are not required. In this case, the instruction cannot be finished and completed until all processing for prior instructions is done. The processing of checkpointing instructions of these two types is shown in more detail in FIG. 3 and FIG. 4.

Figure 3:
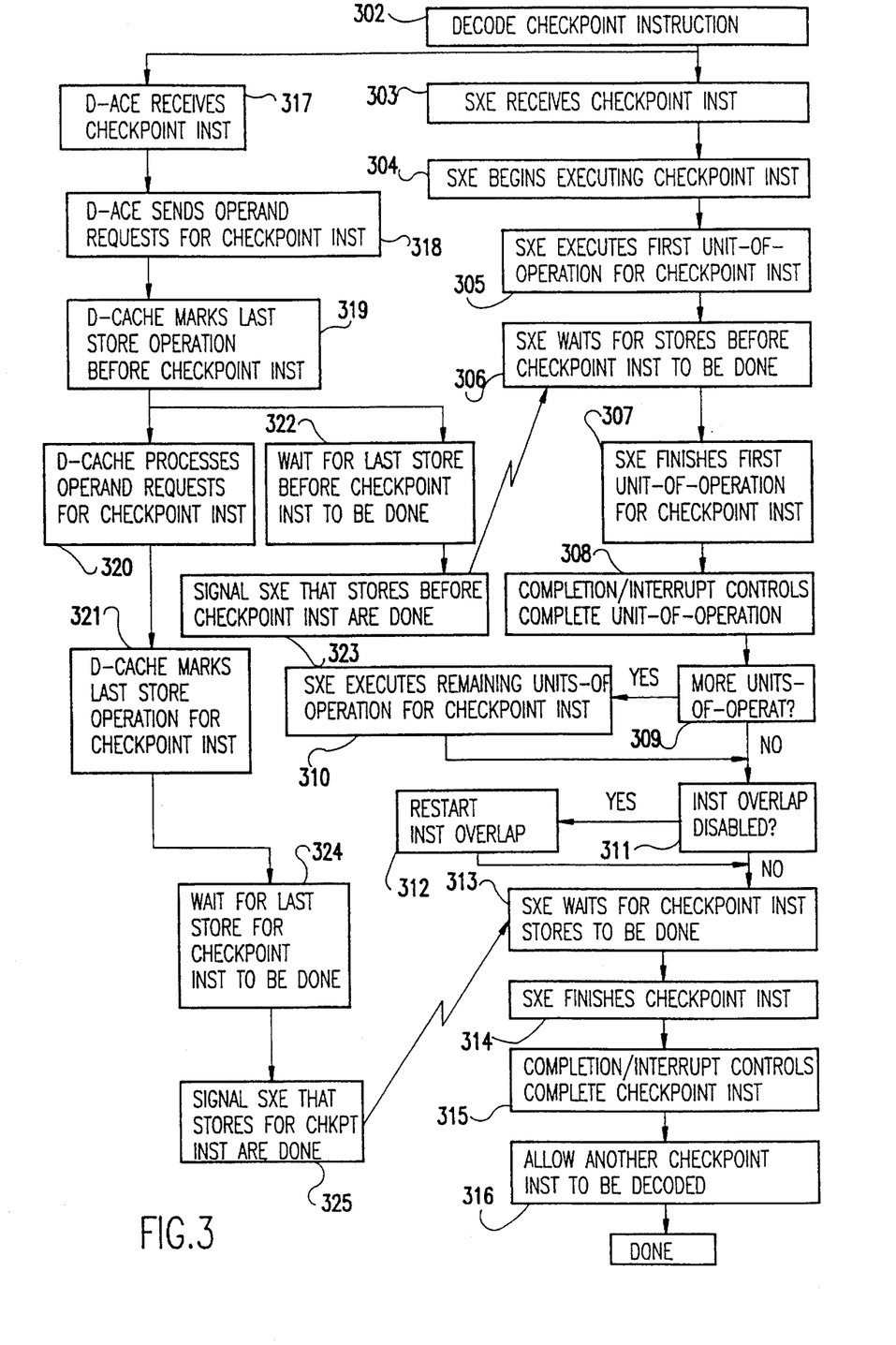
FIG. 3 illustrates the manner in which the present invention processes a checkpointing instruction which includes operand stores.

FIG. 3 illustrates the manner in which the present invention processes a checkpointing instruction which includes one or more operand stores. It will be observed from FIG. 3 that steps 303–316 are performed in parallel steps 317–325. In step 302, the instruction decode logic 204 decodes the checkpointing instruction and sends it to both the SXE 228 and the ACE 208. After decoding the checkpointing instruction, the I-decode controls 204A will prevent any subsequent checkpointing instructions from being decoded until the present checkpointing instruction is complete. Other instructions may in general be decoded while processing the checkpointing instruction. Some instructions (some of which checkpoint) will, however, cause the I-decode controls 204A to prevent any other instructions from being decoded while processing that instruction, for reasons unrelated to checkpoint synchronization. This is referred to as disabling instruction overlap.

In step 303 the SXE 228 receives the checkpointing instruction, and in step 304 the SXE 228 begins executing that instruction. The execution of the checkpointing instruction by the SXE 228 proceeds in step 305 up to the end of the first unit-of-operation (UOP). The SXE 228 then waits in step 306 for a signal from the D-cache 210 that the stores from before the checkpointing instruction are done. The SXE 228 then finishes the first UOP for the checkpointing instruction in step 307, and in step 308 the completion/ interrupt controls 240 complete the UOP.

if there are additional units-of-operation for the checkpointing instruction (as determined by step 309), these are executed, finished, and completed in step 310 in a similar manner by the SXE 228 (by iteratively performing steps 305, 307 and 308 but skipping step 306) and completion/ interrupt controls 240.

If the checkpointing instruction is one for which the I-decode controls 204A disable instruction overlap (as determined by step 311), then after all units of operation have been executed and completed the SXE 228 signals the I-decode controls 204A in step 312 that instruction decoding may be resumed.

When all units-of-operation have been executed and completed, the SXE 228 waits in step 313 for the operand stores from the checkpointing instruction to be done, as signalled by the D-cache 210. The SXE 228 then finishes the checkpointing instruction in step 314, and the completion/interrupt controls complete that instruction in step 315.

In step 316, the I-decode controls 204A respond to the completion of the checkpointing instruction by allowing another checkpointing instruction to be decoded.

In step 317, the ACE 208 receives the checkpointing instruction from I-decode logic 204. In step 318, the ACE 208 generates the operand fetch and store requests for the checkpointing instruction, and sends these requests to the D-cache 210 with an indication that they are for a checkpointing instruction.

In step 319 the D-cache 210, upon receiving requests for a checkpointing instruction, marks the most recent store in the store queue as being the last store before a checkpoint.

In step 322, the D-cache checkpoint controls 210C wait for the last store before the checkpointing instruction to be done, as indicated by the Level Two High Speed Buffer 106. The D-cache checkpointing controls 210C then signal the SXE 228 in step 323 that all stores before the checkpointing instruction are done. This is the signal upon which the SXE 228 is waiting in step 306.

In step 320 the D-cache 210 processes the requests for the checkpointing instruction. When all of these requests have been processed, the D-cache 210 marks the last store done for the checkpointing instruction in the store queue 210A, in step 321.

In step 324 the D-cache checkpoint controls 210C wait for the last store for the checkpointing instruction to be done, as indicated by the Level Two High Speed Buffer 106. The D-cache checkpointing controls 210C then signal the SXE 228 in step 325 that all stores for the checkpointing instruction are done. This is the signal upon which the SXE 228 is waiting in step 313.

Figure 4:
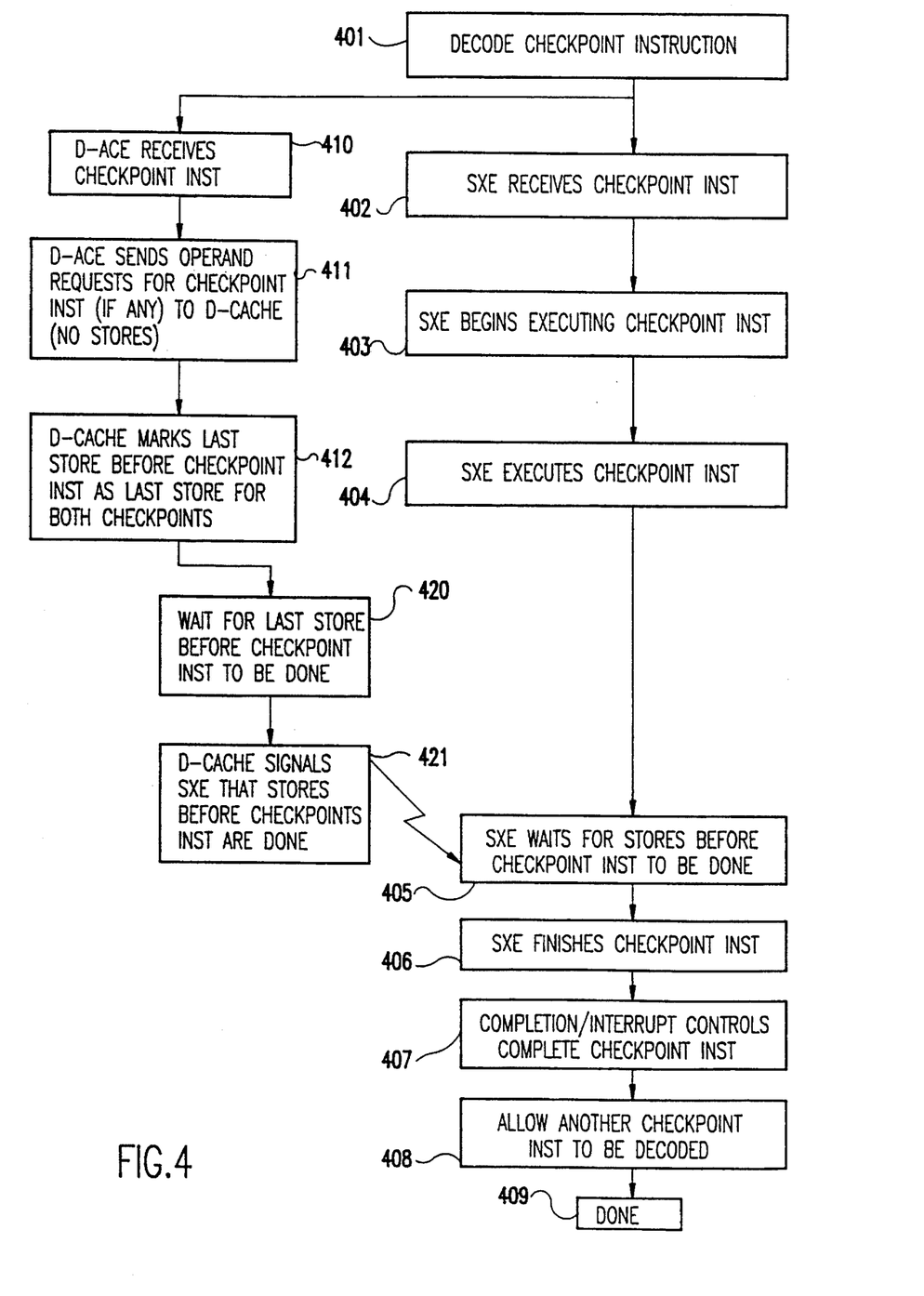
FIG. 4 illustrates the manner in which the present invention processes a checkpointing instruction which does not include operand stores.

FIG. 4 illustrates the manner in which the present invention processes a checkpointing instruction which does not include operand stores. It will be observed from FIG. 4 that steps 402–408 are performed in parallel steps 410–421.

In step 401, the I-decode logic 204 decodes the checkpointing instruction and sends it to both the SXE 228 and the ACE 208. After decoding the checkpointing instruction, the I-decode controls 204A will prevent any subsequent checkpointing instructions from being decoded until the present checkpointing instruction is complete. Other instructions may in general be decoded while processing the checkpointing instruction. Some instructions (some of which checkpoint) will, however, cause the I-decode controls 204A to prevent any other instructions from being decoded while processing that instruction, for reasons unrelated to checkpoint synchronization.

In step 402 the SXE 228 receives the checkpointing instruction, and in step 403 the SXE 228 begins executing that instruction. The execution of the checkpointing instruction by the SXE 228 is done in step 404. The SXE 228 then waits in step 405 for a signal from the D-cache 210 that the stores from before the checkpointing instruction are done.

The SXE 228 then finishes the checkpointing instruction in step 406, and the completion/interrupt controls complete that instruction in step 407.

In step 408, the I-decode controls 204A respond to the completion of the checkpointing instruction by allowing another checkpointing instruction to be decoded.

In step 410, the ACE 208 receives the checkpointing instruction from I-decode 204. In step 411, the ACE 208 generates the operand fetch requests (if any) for the checkpointing instruction, and sends these requests to the D-cache 210 with an indication that they are for a checkpointing instruction.

In step 412 the D-cache 210, marks the most recent store in the store queue 210A as being the last store before a checkpoint.

In step 420, the D-cache checkpoint controls 210C wait for the last store before the checkpointing instruction to be done, as indicated by the Level Two High Speed Buffer 106. The D-cache checkpointing controls 210C then signal the SXE 228 in step 421 that all stores before the checkpointing instruction are done. This is the signal upon which the SXE 228 is waiting in step 405.

While the invention has been described with reference to the preferred embodiments, various modifications and changes will become apparent to those of skill in the art which may be made without departing from the true spirit and scope of the invention as defined by the appended claims.

Having thus described our invention, what we claim as new and desire to secure Letters Patent is:

1. An apparatus that processes instructions, including checkpoint instructions that establish checkpoint synchronization points where failures that occur before the checkpoint sychronization points may not be reported after the checkpoint sychronization points, comprising in combination:

means for decoding a checkpoint instruction that includes an operand store step;

means for executing a first unit of operation of said checkpoint instruction up to a point prior to said operand store step;

means for identifying an operand store operation that is a last store operation for instructions prior to said checkpoint instruction;

means for delaying completion of said first unit of operation until after completion of said last store operation:

means for executing a second unit of operation of said checkpoint instruction that does not change execution results from said execution of a first unit of operation step; and means for signaling completion of said checkpoint instruction only after completion of said operand store step for said checkpoint instruction.

2. The apparatus of claim 1, further comprising second means of decoding an instruction other than said checkpoint instruction and executing it concurrently with said checkpoint instruction to a point prior to completion, said second decoding means being executed subsequent to said decoding of said checkpoint instruction.

3. The apparatus of claim 1, further comprising means of signaling completion of said first unit of operation.

4. The apparatus of claim 1, wherein said first unit of operation is completed only after completion of operand store operations for instructions prior to said checkpoint instruction.

5. The apparatus of claim 4, further comprising second means of decoding an instruction other than said checkpoint instruction and executing it concurrently with said checkpoint instruction to a point prior to completion, said second decoding means being executed subsequent to said decoding of said checkpoint instruction.

6. The apparatus of claim 4, further comprising means of signaling completion of said first unit of operation.

* * * * *

UNITED STATES PATENT AND TRADEMARK OFFICE
CERTIFICATE OF CORRECTION

PATENT NO. :   5,495,590
DATED      :   Feb. 27, 1996
INVENTOR(S):   Steven T. Comfort, et al.

It is certified that error appears in the above-identified patent and that said Letters Patent is hereby corrected as shown below:

Col. 10, line 64          Delete "step".

Signed and Sealed this

Third Day of September, 1996

*Attest:*

BRUCE LEHMAN

*Attesting Officer*          *Commissioner of Patents and Trademarks*